(12) United States Patent
Arbter et al.

(10) Patent No.: US 8,219,253 B2
(45) Date of Patent: Jul. 10, 2012

(54) REGULATOR MODULE FOR A VALVE CLUSTER

(75) Inventors: Jurgen Arbter, Waiblingen (DE);
Thomas Kintzel, Esslingen (DE);
Gerhard Nolle, Plochingen (DE); Klaus Rautenbach, Esslingen (DE)

(73) Assignee: Festo AG & Co. KG, Esslingen (DE)

(*) Notice: Subject to any disclaimer, the term of this patent is extended or adjusted under 35 U.S.C. 154(b) by 527 days.

(21) Appl. No.: 12/091,142

(22) PCT Filed: Mar. 29, 2007

(86) PCT No.: PCT/DE2007/000562
§ 371 (c)(1),
(2), (4) Date: Apr. 22, 2008

(87) PCT Pub. No.: WO2008/119306
PCT Pub. Date: Oct. 9, 2008

(65) Prior Publication Data
US 2010/0211227 A1    Aug. 19, 2010

(51) Int. Cl.
*G05D 7/00* (2006.01)
(52) U.S. Cl. .................................. 700/282; 137/884
(58) Field of Classification Search .................. 700/282; 137/884
See application file for complete search history.

(56) References Cited

U.S. PATENT DOCUMENTS

| 5,884,664 A | 3/1999 | Nagai et al. |
| 2006/0090802 A1* | 5/2006 | Vester ........................... 137/884 |
| 2006/0151035 A1* | 7/2006 | Karcher ........................ 137/884 |

FOREIGN PATENT DOCUMENTS

| DE | 4111890 A1 | 10/1992 |
| DE | 19828024 B4 | 2/1999 |
| EP | 1584945 A1 | 10/2005 |
| EP | 1586780 A1 | 10/2005 |
| WO | WO9404831 A1 | 3/1994 |
| WO | WO0133087 A2 | 5/2001 |

OTHER PUBLICATIONS

English machine translation of EP 1586780.*
English human translation of EP 1586780 A1.*
English human translation of WO 01/33087 A2.*

* cited by examiner

*Primary Examiner* — Ryan Jarrett
(74) *Attorney, Agent, or Firm* — Hoffmann & Baron, LLP

(57) ABSTRACT

A regulator module serves for the regulation of an actuator, in particular a pneumatic drive, and has a regulator communication interface for for output of the regulation target value and receiving an input actual value. The regulator module comprises concatenating contacts for in line arrangement on a fluid power and in particular pneumatic valve cluster with several valve modules, arranged in a row direction adjacent to each other for the fluid control of fluid power actuators and that the regulator module has an internal bus interface for connection with an internal communication bus of the valve cluster and that the regulator module is able to be connected by way of the internal communication bus with a valve cluster communication means for external communication of the valve cluster.

14 Claims, 3 Drawing Sheets

REGULATOR MODULE FOR A VALVE CLUSTER

This application is a National Phase application of International Application No. PCT/DE2007/000562, filed Mar. 29, 2007, which is incorporated herein by reference.

BACKGROUND OF THE INVENTION

1. Field of the Invention

The invention relates to a regulator module for the regulation of an actuator, in particular a pneumatic drive, the regulator module having a regulator communication interface for output of the regulation target value and receiving an input actual value.

2. Description of the Related Art

Such a regulator module is for example described in the German patent publication DE 198 28 024 B4. The regulator module centrally regulates several pneumatic drives by way of a field bus, with which the drives are connected. All drive shafts are controlled by a single regulator module. In this case the respective computing capacity or regulating capacity of the regulator module restricts the number of drives, which can be connected with the regulator module.

For the connection of such a regulator module with peripheral devices further interfaces are required, as for example for a master controller or a programming tool. In the course of configuration and parameterizing of the regulator module numerous individual values must be set for the individual drive shaft, something which may be a time consuming task with the likelihood of errors.

Accordingly one object of the present invention is to suggest a flexibly utilizable regulator design.

SUMMARY OF THE INVENTION

In order to attain this object in the case of a regulator module of the type initially mentioned there is a provision such that it comprises concatenating contacts for in-line arrangement on a fluid power and in particular pneumatic valve cluster with several valve modules, arranged in a row direction adjacent to each other, for the fluid control of fluid power actuators and that the regulator module has an internal bus interface for connection with an internal communication bus of the valve cluster and that the regulator module is able to be connected by way of the internal communication bus with a valve cluster communication means for external communication of the valve cluster.

The valve cluster in accordance with the invention is provided with several valve modules arranged adjacent to each other in a row direction for the fluid power control of fluid power actuators, with a valve cluster communication means for an external communication of the valve cluster and with an internal communication bus for internal communication of the valve cluster communication means and the valve modules and possesses at least one regulator module, in accordance with the invention, connected in line with the valve cluster communication means, for the regulation of an actuator. The at least one regulator module comprises an internal bus interface for the internal communication bus for communication with the valve cluster communication means so that the at least one regulator module is connected, for external communication, with the valve cluster communication means.

The regulator communication interface may be utilized for completing a regulation circuit. The invention contemplates a modular or granular design, in the case of which one or more regulator modules may be placed in line with the valve cluster so that the valve cluster is able to be adapted to the necessary regulation tasks individually.

Furthermore there is the advantage that the regulator module uses the supply voltage infrastructure already existing and the communication infrastructure of the valve cluster. To take an example the regulator module may be connected by way of the internal bus of the valve cluster with the valve cluster communication means in order to communicate via same with external components, as for example a master controller, a parameterizing device, a diagnostics device or the like. The valve cluster communication means has for example a field bus interface, a universal serial bus (USB) interface or the like. Furthermore valve cluster communication means can be adapted for wireless communication. The valve cluster communication means is for example permanently attached to a fluid distributor of the valve cluster. In the case of the valve cluster communication means a modular designed is however also an advantage, in the case of which it is designed as an interface module. Accordingly it is also possible for several communication means or interface modules to be placed in line with the valve cluster in a manner dependent of the communication tasks with external components (master controller, programming device).

Furthermore it is possible for the valve cluster to contain a local control means, as for example by way of a memory programmable controller. The control means can be a component of the communication means.

In the case of the actuator to be regulated it is a question for example of a fluid power actuator, f. i. a pneumatic or hydraulic actuator. The valve cluster is then for example a pneumatic or hydraulic valve cluster. Moreover it is possible for the actuator to be an electrical actuator or furthermore a fluid power-electrical hybrid drive, i.e. for example a drive with a pneumatically and electrically driven piston or, respectively, armature.

The regulator modules may with advantage communicate by way of the internal bus with one another, for example in order to coordinate regulation tasks.

The at least one regulator module of a valve cluster in accordance with the invention is with advantage able to be controlled by way of the valve cluster communication means and/or parameterizable. Furthermore the regulator module may provide for output of diagnostic data, as for instance wear, numbers of duty cycles or the like, with respect to the valve cluster communication means. It is possible to parameterize several regulator modules by way of one and the same valve cluster communication means, to control the regulator modules and to receive diagnostic data from same. The organization of the respective regulator modules is simplified, because same may be controlled in a parameterized manner by way of a common interface, namely the valve cluster communication means. Nevertheless it is possible to line up, in a modular manner, further regulator modules with the valve cluster and to include them in a parameterizing or configuration project.

Admittedly it would in principle be possible for the regulator module to provide for communication of regulation values by way of the internal bus, as for example output of target values, and/or for input of actual values. It is however advantageous for the regulator communication interface to effect a rapid target value output and correspondingly a rapid reception of actual values by having the regulator communication interface in the form of an interface separate from the internal bus interface. Accordingly a separate regulator communication interface is definitely available for regulation tasks. It is preferably a digital interface, which, as compared with an analog interface also renders possible error-free signal transmission over long transmission routes. For instance in the case of the interface it is a question a so-called synchronous serial interface (SSi).

The regulator communication interface is best in the form of a real time interface.

For modular further development and more particularly for serial concatenation of components, able to be placed in line with the regulator communication interface, and are to be regulated, it is an advantage for the regulator communication interface to be a bus interface, as for example a field bus interface. The bus interface is best in the form of a real time bus interface.

The regulator communication interface and/or the internal bus interface may be connected by wiring or in a wireless manner, for example by radio or optically.

The actuator regulated by the regulator module is preferably a fluid power actuator, which is controlled by the regulator module via a valve means. Accordingly the regulator module also regulates the actuator indirectly by way of the valve means. The actuator may also possess electrical drive components, for example an exciting magnetic field for driving a piston.

It would admittedly in principle be possible for the valve means to be constituted by a valve module of the valve cluster. It is then an advantage, for realizing the high speed regulator communication interface, for the regulator module to possess distinct concatenating contacts via which it communicates, separately from the internal communication bus, with the valve module, which drives the actuator to be controlled. It is an advantage however for the valve means to be a means separate from the valve cluster, f. i. a so-called servo valve. The valve means placed clear of the valve cluster may be a subassembly separate from the actuator to be controlled or a component of the actuator. The valve is then integrated in the actuator.

The valve means and the actuator and/or a sensor arrangement are preferably coupled in series with the regulator communication interface. Then only one single wire connection is required for the regulation tasks. There is then a cascaded arrangement. For instance the serial connection may be a bus connection. Looped-through contacts for example would also be possible on the valve means. The sensor arrangement is for example arranged on the actuator or associated with the sensor arrangement in some other way and finds the actual value of the actuator, as for example pressure values, position values or the like. Sensors, f. i. pressure sensors, may also advantageous on the valve means. Sensors may be an advantage on the valve means too, for example pressure sensors.

In this respect it is to be stressed that for the output of target values and for the input of actual values, for example sensor arrangements in each case separate output and input interfaces can be provided or the regulator module may possess a sensor data input interface for additional sensor data, as for example temperature data signaling overheating conditions.

The regulator module preferably comprises a receiving means for the reception of device identification data of the actuator to be regulated and/or a sensor arrangement, which is associated with the actuator and/or a control means, controlling the actuator, as for example the above mentioned valve means. The receiving means may be an interface separate from the regulator communication interface. It is an advantage however for it to be integrated in the regulator communication interface.

The device identification data are for example a type of a device, a serial number of the device, physical quantities, f. i. length, working surface of an actuator member or of a piston, pressure values, more particularly maximum pressures and rated operating pressures, power output values, power output values as related to set pressures, a working stroke or the like. Furthermore kinematic data of the fluid power device, for example speed values, for example a maximum speed, retard travel or the like may represent device identification data.

The receiving means serves for output of the device identification data, for example by way of the internal bus interface so that same are transmitted for example by way of the valve cluster communication means to a master controlling means or to a local control means comprised in the valve cluster.

As initially noted it is an advantage if a regulator module in accordance with the invention realizes a granular concept. More particularly this is appropriate when it is designed for the regulation of a single actuator so that the operation of the regulator module is simplified. The actuator is for example a drive for one drive shaft. The regulator module, which is only associated with this single actuator, may be simply parameterized.

However it may also be advantageous if the regulator module is designed for the regulation of only a few, for example two, actuators. Such actuators may be able to be operated independently or, in an advantageous design in accordance with the invention, they may be concatenated with each other. For instance the two actuators may be the two actuators for the X and Y shaft drives of a gantry or a slide of a machine tool.

In the case of the regulator module various different regulation tasks may be performed by it as for example position regulation, power regulation, pressure regulation or the like. It is an advantage. in the case of fluid power actuators or mixed fluid and electrical actuators and more especially actuators operated by compressed air, if the position regulation involves slave pressure or power regulation. The position regulation provides for the positioning of the actuator member at a predetermined position. When the position is reached, pressure regulation is advantageous. For instance it sets a differential pressure between a piston chamber on the drive side and a piston chamber on the output drive side to zero so that the actuator member comes to a halt at the position reached and does not creep out of it.

It is advantageous for the regulator module to be able to be switched over between the various different regulation modes, for which purpose for example a local switch or parameterizing by way of the valve cluster communication means are advantageous.

As already noted the regulator module in accordance with the invention uses the existing supply infrastructure of the valve cluster. Accordingly the concatenating contacts for example comprise connection contacts for connection with a first supply voltage of the valve cluster. The regulator module supplies the actuator to be regulated or a control means preceding it or a sensor arrangement with this first supply voltage. The supply voltage exists for example in relation to a ground potential at a bus rail of the valve cluster.

The concatenating contacts are preferably arranged at opposite side walls of the regulator module. Between the respective concatenating contacts at opposite sides it is an advantage to have connections so that the concatenating contacts are as it were are looped through the regulator module. Accordingly further regulator modules or other components can be placed in line with the regulator module.

The concatenating contacts may include first and second supply contacts for the connection with a first and a second supply voltage of the valve cluster, the first and the second supply voltage being the same or different. For instance the first and second supply voltages may be the same or different. The first supply voltage may equal to 5 volt and the second supply voltage 10 volt. The regulator module preferably supplies the actuator or a drive means controlling it, for example the above mentioned regulator module placed clear of other components, a sensor arrangement or the like with the first and the second supply voltage. The regulator module provides the supply voltage to, for example, the regulator communication interface or to separate supply contacts. The valve cluster therefore for example has two or more supply bus rails, with which a regulator module can be coupled. By switching on and switching off a bus rail it is possible, for example, to switch a machine area on and off. It is possible for different regulator modules to have access to different supply bus rails of the valve cluster. Furthermore, a regulator module may have access to several supply voltages and for example to make a first supply voltage available to a first actuator to be regulated and a second supply voltage available to a second actuator to be regulated. The respective first, second or further supply voltage to be utilized is best able to be chosen by means of an electrical switch of the regulator module. However a software design is advantageous, that is to say there is a parameterizing facility for the selection of the respective supply voltage.

In the following working examples of the invention will be explained with reference to the drawings.

DETAILED DESCRIPTION OF THE PREFERRED EMBODIMENTS

Figure 1:
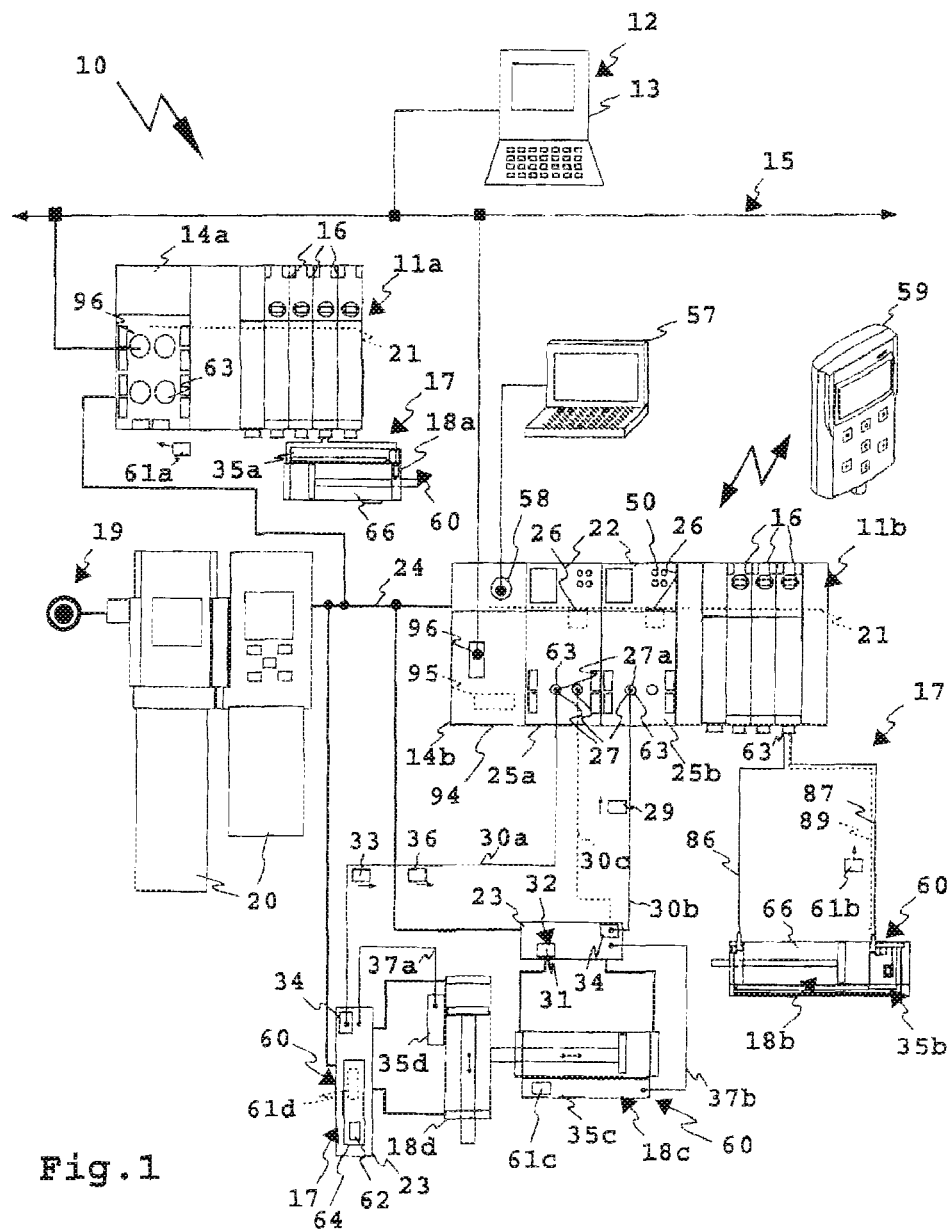
FIG. 1 diagrammatically shows an automated system with two valve clusters and one primary control unit.
Figure 2:
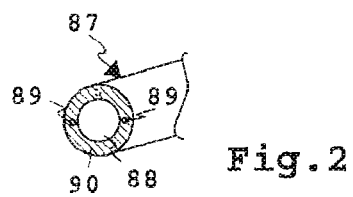
FIG. 2 shows a fluid duct with integrated electrical conductors for the connection of an actuator with a valve cluster as shown in figure in FIG. 1.
Figure 3:
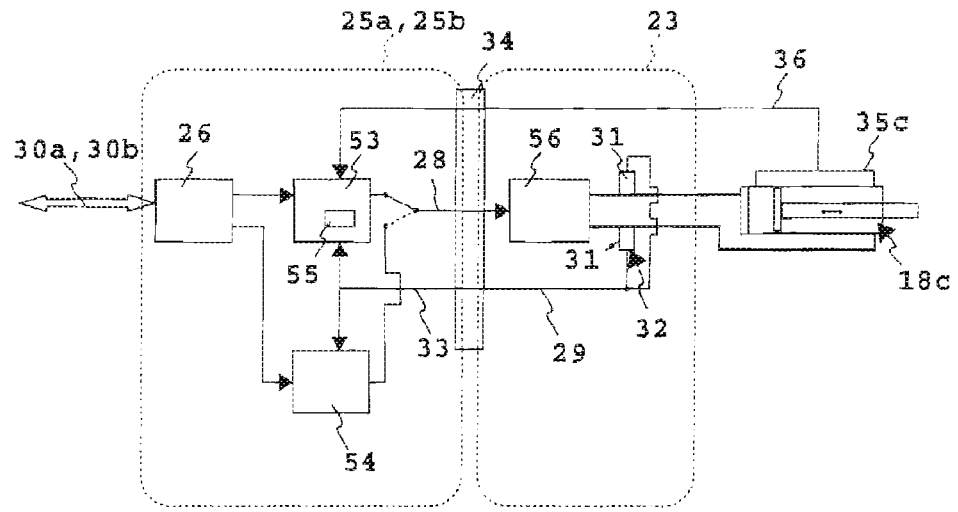
FIG. 3 is a diagrammatic showing of a regulator module of a valve cluster according to FIG. 1.
Figure 4:
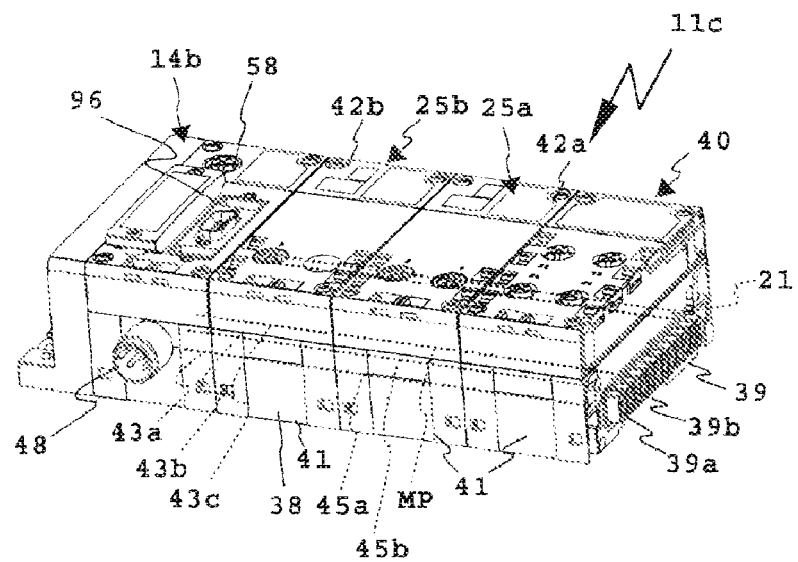
FIG. 4 shows a communication and regulator part of a valve cluster in accordance with the invention having a valve cluster communication means, two regulator modules and an input module.
Figure 5:
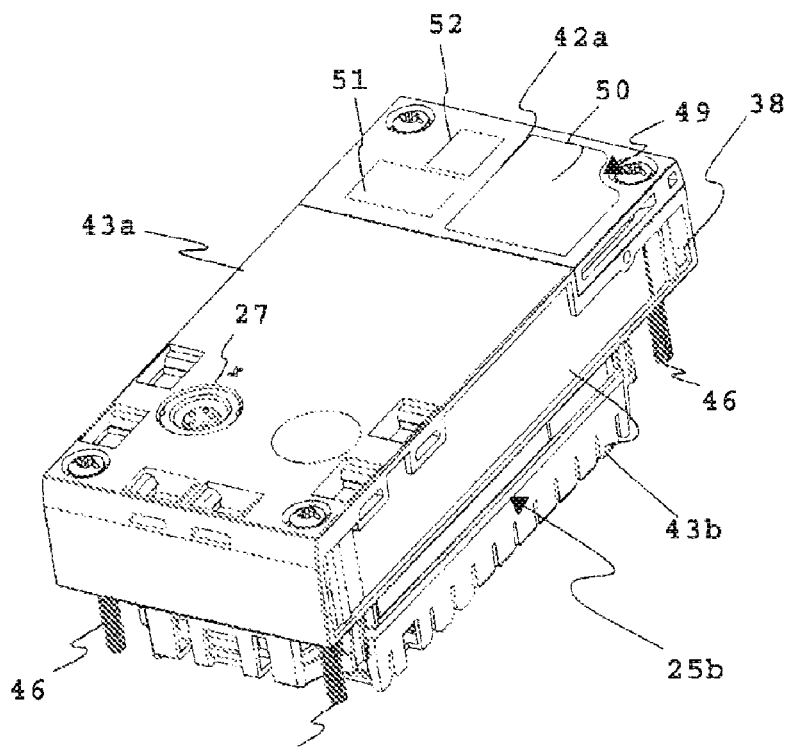
FIG. 5 shows a regulator module of the valve cluster in accordance with FIG. 4 for the regulation of a single actuator.
Figure 6:
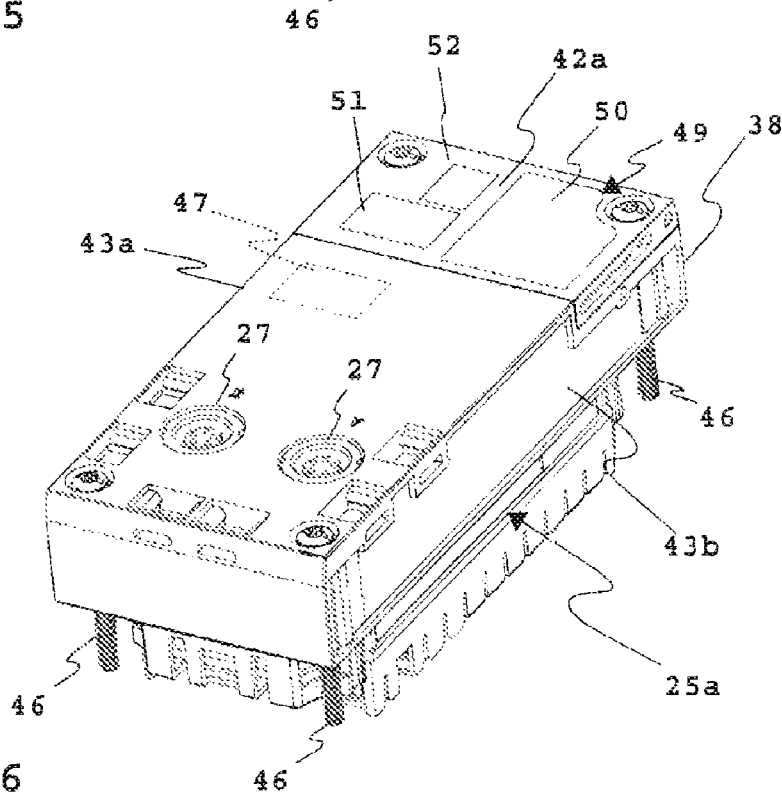
FIG. 6 shows a regulator module of the valve cluster according to FIG. 4 for the regulation of two actuators.

The working embodiments of the invention include partially similar or functionally equivalent components which are not described twice over and are provided with the same reference numerals.

In the case of an automated system 10 valve clusters 11a and 11b are controlled by a central master control means 12, as for example a routing computer 13. The valve clusters 11a and 11b are connected with valve cluster communication means 14a and 14b for external communication on a system bus 15, for example a field bus, by way of external interfaces 96, for example bus interfaces. The control means 12 control the valve clusters 11a and 11b via the system bus 1, which is connected in a wired or a wireless manner.

The valve clusters 11a and 11b comprise valve modules 16, which are placed in a row with the communication means 14a and 14b. The valve modules 16 serve for fluid control of the fluid power apparatus 17, for example pneumatic actuators 18a and 18b. The actuators 18a and 18b are pneumatic drive cylinders 66, which as illustrated may have piston rods although designs without piston rods or with an additional electrical drive part are possible. The regulation modules 25a and 25b are also designed for the regulation of electrical or combined fluid power and electrical drives. Thus for example instead of the pneumatic actuator 18d an electrical drive could be provided.

The valve clusters 11a and 11b are run on compressed air, for example from a compressed air source 19. The compressed air source 19 supplies, for example, servicing apparatus 20, as f. i. filters and oilers, which prepare compressed air for the valve clusters 11a and 11b. The servicing apparatus 20 is in the present case separate from the valve clusters 11a and 11b, although it could for example constitute components of the valve cluster 11b.

From the central control means 12 the valve modules 16 receive control instructions for the pneumatic control of the actuators 18a and 18b via the system bus 15. The communication means 14a and 14b transmit the control instructions so received by way of internal communication buses 21 to the valve modules 16. The communication buses 21 serve for internal communication of the valve clusters 11a and 11b.

While the valve cluster 11a is controlled exclusively externally by way of the system bus 15, the valve cluster 11b has a local control competence in the form of control means 22. The control means 22 are designed in the form of control modules, which are placed in circuit between the valve modules 16 and the communication means 14b in the form of a communication module.

Optionally it is possible for the valve cluster 11b to have a local control means 94 for its control, f. i. of the valve modules 16, as for example a separate control module. The communication means 14b as well can be designed in the form of such a local control means 94 for the valve cluster 11b. For this purpose the communication means 14b will then for example have a processor 95, which transmits control instructions by way of communication bus 21, for example to the valve modules 16.

The control means 22 control valve means 23, which for their part control actuators 18c and 18d. The actuators 18c and 18d constitute, for example, servo drives. Admittedly the actuators 18c and 18d could constitute two drives independent of each other. However the actuators 18c and 18d are mechanically coupled with each other. In the drawing this is diagrammatically indicated since the actuator 18d is arranged on a force output means of the actuator 18c, for example on its piston rod. A mechanical coupling may however be realized indirectly, for example if the actuators 18c and 18d constitute the drives of a gantry or carriage traveling in the X and the Y directions.

The valve means 23 are valves separate from the valve cluster 11b and connected with a compressed air network 24 supplied by the compressed air source 19 with compressed air. The valve means 23 control the compressed air supply to the actuators 18c and 18d, which are for example pneumatic drive cylinders. The valve means 23 and the actuators 18c and 18d also constitute fluid power apparatus 17.

The control means 22 regulate the actuators 18c and 18d by control of the valve means 23 for regulation. The control means 22 are for example regulation modules 25a and 25b. The regulation modules 25a and 25b fit in well with the modular concept of the valve cluster 11b. They are able to be placed in line with the valve modules 16 and the communication means 14b. The regulation modules 25a and 25b are coupled at internal bus interfaces 26 with the internal communication bus 11b. The regulation modules 25a and 25b may receive messages by way of the communication bus 21, as for example control instructions from the control means 12 and may transmit messages, as for example indications, which the communication means 14b passes on to the control means.

For their regulation tasks the regulation modules 25a and 25b have separate regulation communication interfaces 27 for the issue of target values 28 and the reception of actual values 29. The communication interfaces 27 are real time interfaces. The communication interfaces 27 comprise digital bus interfaces 27a. The valve means 23 are connected by way of bus lines 30a and 30b with the communication interfaces 27 so that each fluid power unit to be regulated comprising a respective valve means 23 and one of the actuators 18c and 18d has a separate regulator bus line 30aa or 30ab available for it. Accordingly rapid communication is possible between the units to be regulated and the assigned regulation module 25a and 25b.

Between each regulation module 25a and 25b and its arrangement to be regulated 23 and 18c or 23 and 18d there is a separate physical connection. The actual values 29 are then transmitted by these connections.

As an alternative the regulation module 25a could be a regulator for two actuators and regulate both arrangements 23, 18c and 23 and 18d via the bus line 30a and an optional bus line 30c leading to the regulation module 25a in lieu of the bus line 30b.

The actual values 29 contain pressure sensor values 33 for example, which are generated by pressure sensors 31 of a sensor arrangement 32 of the valve means 23. The pressure sensors 31 are for example arranged on ports of pressure lines, by which the actuators 18c and 18d are joined with the valve means 23. To this extent the valve means 23 constitute sensor means. The valve means 23 transmit the pressure sensor values 33 by means of a bus coupler 34 which to this extent constitutes a sensor communication interface, on the respective bus line 30a or 30b to the regulation module 25a or 25b.

Sensor means 35c and 35d arranged on the actuators 18c and 18d produce further sensor values as actual values 29, for example pressure values, temperature values and/or position values 36.

The sensor means 35c and 35d are coupled serially with the valve means 23 via bus lines 37a and 37b. For this purpose it is however also possible for the connection contacts for the valve means 23 to have separate bus couplers. It is however possible as well for this for the bus lines 37a and 37b at the valve means 23 to be looped through to the corresponding connection contacts of the bus couplers 34. In any case the connection of the sensor devices 35c and 35d and of the valve means 23 is simplified because these means are coupled with each other in series because only one connection line leads to the regulation or communication interfaces 27.

The adjustment of parameters, in particular regulation parameters and/or a selection of the type of regulation (position regulation, pressure regulation, position regulation with slave pressure regulation) and/or a diagnosis of the modules of the valve cluster 11b, f. i. of the regulation modules 25a and 25b, may be undertaken at some central position using a user device 57, as for example a notebook. The user device 57 is able to be connected with a user device interface 58 of the communication means 14b and is thus able to be connected with the internal communication bus 21. Then parameters may be loaded from the user device 57 to the valve cluster 11b, for example the regulation modules 25aa and 25ab or any other modules. Furthermore a diagnosis is possible using the user device 57. Thus for example the regulation modules 25a and 25b can transmit failure messages, indications as regards a number of duty cycles already performed or other diagnostic data to the user device 57.

It will be clear that wireless operation or diagnosis is also possible, for example using a user device 59, which communicates with the communication means 14b in a wireless fashion.

The putting into operation of the automated system 10 and diagnosis and/or parameterrizing of the regulation modules 25a and 25b is simplified by an auto-identification concept. The fluid power apparatus 17 or means assigned to it, as for example sensor means 35a, 35b and 35c assigned to the actuators 18a through 18c, comprise or constitute indent data transmission means 60, which transmit apparatus identification data 61a, 61b, 61c, 61d and 62 to receiving means 63 for the identification data 61a through 61c and 62 of the valve clusters 11a and 11b. The identification data 61a through 61d characterize the pneumatic actuators 18a, 18b, 18c and 18d. The identification data 62 characterize the valve means 23.

The apparatus identification data 62 of the valve means 23 are saved in an optionally present memory 64. In the case of the valve means 23 assigned to the actuator 18d in addition the apparatus identification data 61d can be saved as well, which characterize the actuator 18d. The actuator 18d has f. i. no memory of its own for saving its identification data and furthermore no interface to transmit such data to the valve cluster 11b.

The valve means 23 responsible for fluid control of the actuator 18c communicates the apparatus identification data 16c thereof, which it receives by way of the line 37b, via the bus line 30b on to the regulation communication interface 27.

The regulator communication interfaces 27 constitute or include receiving means 63 for the apparatus identification data 62 and 61c and also apparatus identification data 61d of the actuator 18d. On the basis of such apparatus identification data, which for example comprise the working strokes of the actuators 18c and 18d, the regulator modules 25a and 25b regulate the actuators 18c and 18d. In this respect it is possible for the regulator modules 25a and 25b to directly evaluate the apparatus identification data 61c, 61d and 62 for the generation of regulation parameters. Accordingly for example maximum pressures may serve for example for the limitation of pressure of the compressed air by pressure regulation. Furthermore it is possible, using the internal communication infrastructure, namely the internal communication bus 21 and the communication 14b means 14b, for the regulation modules 25a and 25b to transmit the respective apparatus identification data 61b, 61d and 62 to the user device 57, which generates the regulation parameters therefrom and transmits same to the regulation modules 25a and 25b using the said communication path.

The sensor means 35a transmits the apparatus identification data 61a in a wireless fashion to a receiving means 63 comprised in the valve cluster communication means 14a.

The actuator 18b is connected by a conventional pressure line 86 and a fluid connection line 87, which has a fluid duct 88 and data lines 89, with the valve cluster 11b. The data lines 89 are for example arranged in a casing 90 encircling the fluid duct 88. On plugging in the fluid connecting line 87 contacts (not illustrated) of the valve cluster 11b and of the sensor means 35b are connected with the data lines 89 so that simultaneously a fluid connection and a data connection are produced between the valve cluster 11b and the sensor device 35b and also the actuator 18b.

The sensor device 35b transmits the apparatus identification data 61b in a wired manner, f. i. by way of the data lines 89, to a receiving means 63, which for example is comprised in the valve module 16 driving the actuator 18b.

The production of electrical connection for the valve cluster 11b is simple: on housings 38 of the regulator modules 25a and 25b lateral concatenating contacts 39 are provided which on plugging the housings 38 together automatically fit into one another and make contact. This will be seen in the case of a valve cluster 11c at an input-output module 40, whose housing has a bottom part 41 for example, which is identical in structure with the bottom parts 41 of the housings 38. On placing housing top parts 42a and 42b on the housing bottom parts 21 electrical contacts (not visible in the drawing) of the housing top parts 42a and 42b come into contact with lines in the communication bus 21 and with electrical supply lines 43a, 43b and 43c and with further lines not described in detail. The housing top parts 42a and 42b are for example attached by means of screws 46 on the housing bottom parts 41.

The lines of the communication bus 21 and of the supply lines 43 extend respectively between the concatenating contacts 44a and 44b arranged on opposite sides 44a and 44b of the housings 38. Accordingly the regulator modules 25a and 25b are connected in just one plugging maneuver with the communication bus 21 and also with the supply lines 43a, 43b and 43c for electrical power supply. The concatenating contacts 39 comprise first and second supply contacts 39a and 39b, which are connected with the supply lines 43a, 43b and 43c.

Each of the regulator modules 25a and 25b may be supplied separately from the other modules of the valve cluster 11b with supply voltage. For example the supply voltage 45a may be associated with the regulator module 25a and the supply voltage 45b may be associated with the regulator module 25b, while further modules of the valve cluster 11b are coupled with further supply lines not illustrated in the drawings.

The regulator modules 25a and 25b can selectively make available the supply voltage 45a or 45b at their regulator communication interfaces 27 for the supply of external components, as for example the valve means 23. The supply voltages 45a and 45b are for example fed to electrical contacts 48, for example contact pins, of the valve cluster 11b. The contact 48 is provided on the communication means 14b.

For the choice of the supply voltage 45a or 45b it is possible for example to provide electrical switches 47. However it is preferred to have a software implementation, i.e. parameterizing the regulator modules for the choice of the supply voltage 45a or 45b. The supply voltages 45a and 45b may be identical or different supply voltages, for example in relation to a ground potential MP present at the supply line 43c. By switching off the supply voltages 45a or 45b parts of the automated system 10 namely for example the subassemblies 23, 18, 23 and 18d can be switched on and off.

The provision of the regulator modules 25a and 25b means that there is a granular and modular concept, in the case of a respective regulator module may serve for the regulation of a small number actuators, preferably two thereof as is the case with the regulator module 25a or only one single actuator, for example the register 25b. Accordingly the administration of the automated system is simplified. Furthermore the automated system 10 may be reduced in size or expanded, for example by a line up of further regulator modules in accordance with the invention added to the valve cluster 11b.

Each regulator module 25a and 25b is designed for the regulation of a single actuator 18c and 18d. If optionally the regulator module 25a in the form of a twin shaft regulator module regulates both the actuators 18c and 18d, the bus line 30a is connected with the regulator communication interface 27 marked "X" and for the regulation of the actuator 18c the bus line is connected with the communication interface 27, marked "Y" of the regulator module 25a.

The regulator modules 25a and 25b preferably possess display means 49, for example LEDs and preferably an at least partly pixel-based or segmented graphical display, for example an LCD 51 or a seven segment display. The display means 49 are preferably arranged underneath a transparent guard cover 52 and protected against environmental effects. The regulator modules 25a and 25b serve to indicate, for example, operational modes or trouble conditions. The LCD 51 or the seven segment display there is an indication of which regulator module 25a and 25b is presently operating. Such an operation program comprises for example an indication of a position to which the respective actuator 18c or 18d is to travel to, a maximum force to be set for, speeds of travel and retard rates or the like.

The regulator modules 25a and 25b preferably include several regulators, namely a position regulator 53 and a pressure regulator 54. The position regulator 28 or the pressure regulator 54 indicate the target values 28 for a valve 56 of the valve means. The position regulator 53 preferably comprises a slave pressure regulator 55.

What is claimed is:

1. A regulator module for the regulation of an actuator, the regulator module having a regulator communication interface for output of a regulation target value and receiving an input actual value, wherein the regulator module comprises concatenating contacts for in line arrangement on a fluid power valve cluster with several valve modules, arranged in a row direction adjacent to each other, for the fluid control of fluid power actuators the regulator module comprises an internal bus interface for connection with an internal communication bus of the valve cluster and the regulator module is able to be connected by way of the internal communication bus with a valve cluster communication means for external communication of the valve cluster, wherein the regulator communication interface is configured to rapidly output the regulation target value and rapidly input the input actual value separately from the internal bus interface, the regulator module regulating at least one of the fluid power actuators based on the input actual value, the concatenating contacts comprising first supply contacts for connection to a first supply voltage of the valve cluster, the regulator module supplying the actuator to be regulated with the first supply voltage.

2. The regulator module as set forth in claim 1, wherein the valve cluster communication means is at least one of able to be controlled, able to be parameterized, and able to provide output of diagnostic data.

3. The regulator module as set forth in claim 1, wherein the regulator communication interface is a real time interface.

4. The regulator module as set forth in claim 1, wherein the regulator communication interface possesses a bus interface and more especially a field bus interface.

5. The regulator module as set forth in claim 1, wherein at least one of the regulator communication interface and the internal bus interface are wireless.

6. The regulator module as set forth in claim 1, wherein the actuator regulated by the regulator module is a fluid power actuator and in that the at least one regulator module controls a valve means for the regulation of the actuator.

7. The regulator module as set forth in claim 1, wherein a valve means is separate from the valve cluster.

8. The regulator module as set forth in claim 1, wherein at least one of a valve means, the actuator and a sensor arrangement is serially coupled with the regulator communication interface.

9. The regulator module as set forth in claim 1, further comprising a receiving means for at least one of the reception of device identification data of the actuator to be regulated and a drive means for the actuator.

10. The regulator module as set forth in claim 1, wherein the regulator module is configured for the regulation of a single actuator.

11. The regulator module as set forth in claim 1, wherein the regulator module is configured for the regulation of two actuators mechanically concatenated with one another.

12. The regulator module as set forth in claim 1, wherein the regulator module includes at least one of a position regulator, a power regulator, and a pressure regulator.

13. The regulator module as set forth in claim 1, wherein the concatenating contacts include second supply contacts for connection to a second supply voltage of the valve cluster, the regulator module supplying the actuator to be regulated or a controlling means controlling the actuator selectively with the first or the second supply voltage.

14. The regulator module as set forth in claim 13, wherein the first or the second supply voltage respectively to be utilized is at least one of parameterizable and able to be selected using an electrical switch of the regulator module.

* * * * *